US012601710B2

(12) United States Patent
Holt et al.

(10) Patent No.: US 12,601,710 B2
(45) Date of Patent: Apr. 14, 2026

(54) ION-SENSITIVE FIELD-EFFECT TRANSISTORS WITH LOCAL-FIELD BIAS

(71) Applicant: GlobalFoundries U.S. Inc., Malta, NY (US)

(72) Inventors: Judson Holt, Ballston Lake, NY (US); Bartlomiej Jan Pawlak, Leuven (BE); Vibhor Jain, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 692 days.

(21) Appl. No.: 17/987,543

(22) Filed: Nov. 15, 2022

(65) Prior Publication Data

US 2024/0159701 A1 May 16, 2024

(51) Int. Cl.
*G01N 27/414* (2006.01)

(52) U.S. Cl.
CPC ................................. *G01N 27/4148* (2013.01)

(58) Field of Classification Search
CPC ................................................. G01N 27/4148
See application file for complete search history.

(56) References Cited

U.S. PATENT DOCUMENTS 11,016,055 B2 5/2021 Campanella-Pineda et al.
2004/0132204 A1* 7/2004 Chou .................. G01N 27/4148
436/163

2013/0291627 A1* 11/2013 Hu ...................... G01N 27/4146
257/253
2017/0336347 A1* 11/2017 Ram ...................... H04N 25/77
2019/0072516 A1* 3/2019 Jhon .................. G01N 27/4146
2020/0182826 A1* 6/2020 Liu ..................... G01N 27/4145
2020/0350200 A1* 11/2020 Humbert ........... H01L 21/76251
2023/0207633 A1* 6/2023 Suto ................... H03K 19/0013
257/213

FOREIGN PATENT DOCUMENTS

CA 2538232 A1 8/2005
EA 020321 B1 * 10/2014
GB 2416210 A 1/2006

OTHER PUBLICATIONS

Machine translation of EA-020321-B1 (Year: 2014).*
J. C. Dutta, "Ion sensitive field effect transistor for applications in bioelectronic sensors: A research review," 2012 2nd National Conference on Computational Intelligence and Signal Processing (CISP), 2012, pp. 185-191, doi: 10.1109/NCCISP.2012.6189704.
(Continued)

*Primary Examiner* — Erik Kielin
(74) *Attorney, Agent, or Firm* — Thompson Hine LLP; Francois Pagette

(57) ABSTRACT
Structures for an ion-sensitive field-effect transistor and methods of forming same. The structure comprises a semiconductor substrate, a microfluidic channel above the semiconductor substrate, a semiconductor layer including a portion positioned as a sensing layer in the microfluidic channel, a first electrical connection coupled to the portion of the semiconductor layer, and a second electrical connection coupled to the semiconductor substrate. The portion of the semiconductor layer is spaced above the semiconductor substrate.

15 Claims, 8 Drawing Sheets

(56) References Cited

OTHER PUBLICATIONS

Lee CS, Kim SK, Kim M. "Ion-sensitive field-effect transistor for biological sensing." Sensors (Basel). 2009; 9 (9):7111-31. doi: 10.3390/s90907111. Epub Sep. 7, 2009. PMID: 22423205; PMCID: PMC3290489.

Fakih, I., Durnan, O., Mahvash, F et al. "Selective ion sensing with high resolution large area graphene field effect transistor arrays." Nat Commun 11, 3226 (2020). https://doi.org/10.1038/s41467-020-16979-y.

Jeon, Jin-Hyeok & Cho, Won-Ju. (2020). "High-performance extended-gate ion-sensitive field effect transistors with multi-gate structure for transparent, flexible, and wearable biosensors." Science and Technology of Advanced Materials. 21. 10.1080/14686996.2020.1775477.

* cited by examiner

ION-SENSITIVE FIELD-EFFECT
TRANSISTORS WITH LOCAL-FIELD BIAS

BACKGROUND

The disclosure relates generally to semiconductor devices and integrated circuit fabrication and, in particular, to structures for an ion-sensitive field-effect transistor and methods of forming a structure for an ion-sensitive field-effect transistor.

An ion-sensitive field-effect transistor is a type of field-effect transistor that may be used as an electrochemical sensor in applications such as, for example, measuring ion concentration in a solution. The current through an ion-sensitive field-effect transistor, during operation, varies according to the ion concentration in the solution. For example, an ion-sensitive field-effect transistor may be configured to sense the hydrogen ion concentration in a solution in which the current increases with increasing hydrogen ion concentration.

Improved structures for an ion-sensitive field-effect transistor and methods of forming a structure for an ion-sensitive field-effect transistor are needed.

SUMMARY

In an embodiment of the invention, a structure for a sensor device is provided. The structure comprises a semiconductor substrate, a microfluidic channel above the semiconductor substrate, a semiconductor layer including a portion positioned as a sensing layer in the microfluidic channel, a first electrical connection coupled to the portion of the semiconductor layer, and a second electrical connection coupled to the semiconductor substrate. The portion of the semiconductor layer is spaced above the semiconductor substrate.

In an embodiment of the invention, a method of forming a structure for a sensor device is provided. The method comprises forming a microfluidic channel, forming a portion of a semiconductor layer positioned as a sensing layer in the microfluidic channel, forming a first electrical connection coupled to the portion of the semiconductor layer, and forming a second electrical connection coupled to the semiconductor substrate. The portion of the semiconductor layer is spaced above the semiconductor substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
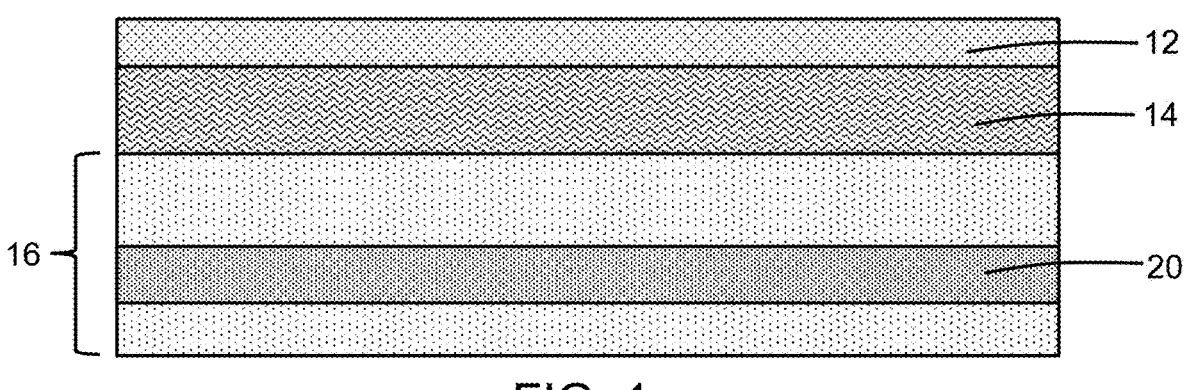
FIG. 1 is a cross-sectional view of a structure at an fabrication stage of a processing method in accordance with embodiments of the invention.
Figure 2:
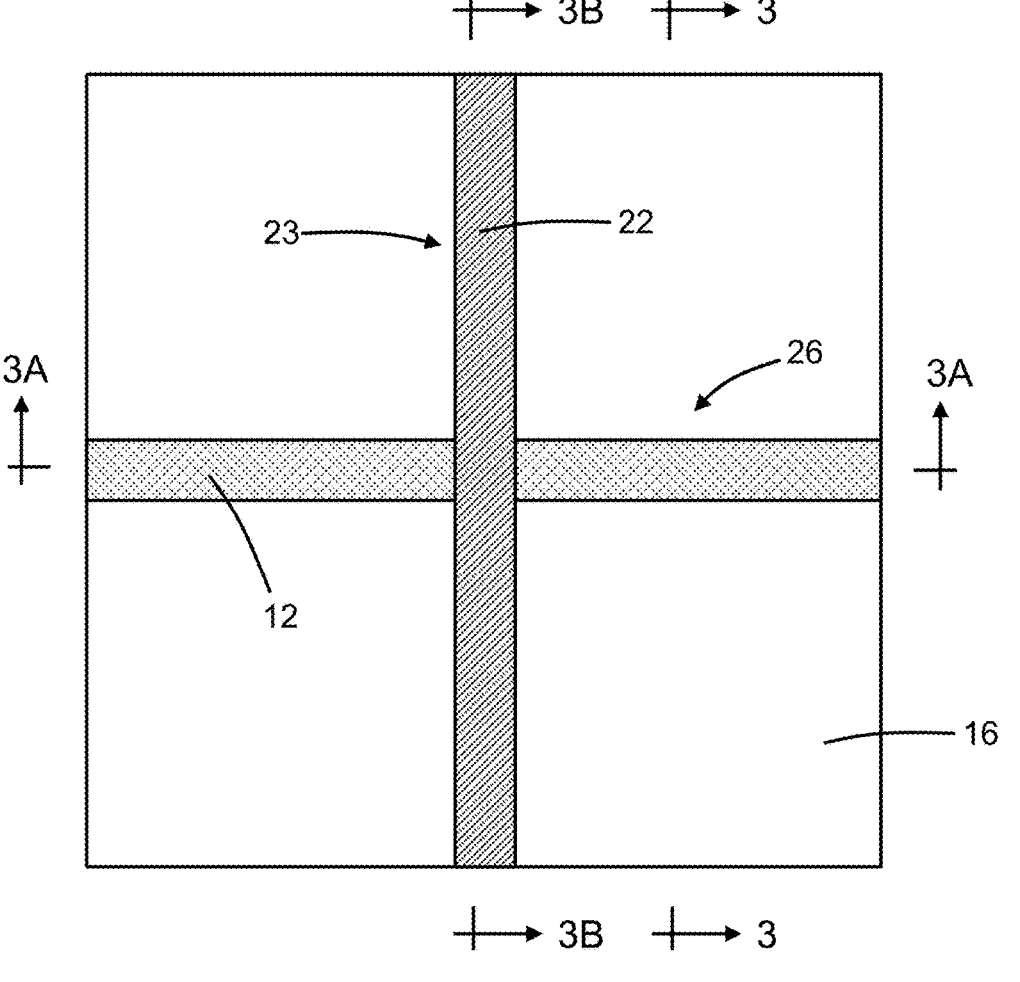
FIG. 2 is a top view of the structure at a fabrication stage of the processing method subsequent to FIG. 1.

With reference to FIG. 1 and in accordance with embodiments of the invention, a substrate 10 includes a semiconductor layer 12, a dielectric layer 14, and a semiconductor substrate 16. The semiconductor layer 12 is separated from the semiconductor substrate 16 by the intervening dielectric layer 14 and may be significantly thinner than the semiconductor substrate 16. The semiconductor layer 12 and the semiconductor substrate 16 may be comprised of a semiconductor material, such as single-crystal silicon, and may be lightly doped to have, for example, p-type conductivity. The dielectric layer 14 may be comprised of a dielectric material, such as silicon dioxide, that is an electrical insulator. The dielectric layer 14 has a lower interface with the semiconductor substrate 16 and an upper interface with the semiconductor layer 12. The semiconductor layer 12 is electrically isolated from the semiconductor substrate 16 by the dielectric layer 14. In an embodiment, the dielectric layer 14 may be a buried oxide layer of a silicon-on-insulator (SOI) substrate, and the dielectric layer 14 may separate the semiconductor layer 12 from the semiconductor substrate 16. In an embodiment, the semiconductor layer 12 may have a thickness suitable to fabricate fully-depleted silicon-on-insulator (FDSOI) device structures. In an embodiment, the semiconductor layer 12 may have a thickness in a range of about 4 nanometers (nm) to about 20 nm.

The substrate 10 may be used to fabricate a sensor device. In that regard, a well 20 of the sensor device is positioned in the semiconductor substrate 16 and has an opposite conductivity type from the portion of the semiconductor substrate 16 beneath the well 20. In an embodiment, the well 20 may be doped with a concentration of an n-type dopant (e.g., arsenic or phosphorus) to provide n-type conductivity. The well 20 may be formed by introducing a dopant by, for example, ion implantation into the semiconductor substrate 16. The implantation conditions (e.g., ion species, dose, kinetic energy) may be selected to tune the electrical and physical characteristics of the well 20. The well 20 isolates the subsequently-formed device structure from the portion of the semiconductor substrate 16 beneath the well 20.

With reference to FIGS. 2, 3, 3A, 3B in which like reference numerals refer to like features in FIG. 1 and at a subsequent fabrication stage, the semiconductor layer 12 and the dielectric layer 14 may be patterned by lithography and etching processes to define a layer stack 26 of the sensor device. The semiconductor substrate 16 adjacent to the opposite sidewalls of the layer stack 26 is exposed by the removal of portions of the semiconductor layer 12 and the dielectric layer 14 during the etching process. The portion of the semiconductor layer 12 in the layer stack 26 is electrically isolated from the semiconductor substrate 16 by the portion of the dielectric layer 14 in the layer stack 26. The layer stack 26 has the shape of a strip that extends longitudinally across the surface of the semiconductor substrate 16. The portion of the semiconductor layer 12 included in the layer stack 26 is spaced above the underlying semiconductor substrate 16 with the portion of the dielectric layer 14 included in the layer stack 26 located in the space between the portion of the semiconductor layer 12 and the underlying semiconductor substrate 16.

A gate structure 23 of the sensor device may include a gate electrode 22 and a gate dielectric layer 24 that are positioned on the top surface 18 of the semiconductor substrate 16. The gate dielectric layer 24 is comprised of a dielectric material, such as silicon dioxide or hafnium oxide, that is an electrical insulator. The gate electrode 22 is comprised of a conductor, such as doped polysilicon and/or a work function metal. The gate electrode 22 and gate dielectric layer 24 may be formed by patterning layers of their respective materials with lithography and etching processes. The gate structure 23 extends across (i.e., overlaps with) the portion of the semiconductor layer 12 included in the layer stack 26. In an embodiment, the gate structure 23 may extend transversely across the portion of the semiconductor layer 12 included in the layer stack 26. In an embodiment, the gate structure 23 may extend transversely across a central portion of the semiconductor layer 12 included in the layer stack 26. The portion of the semiconductor layer 12 overlapped by the gate structure 23 is longitudinally arranged between other portions of the semiconductor layer 12 included in the layer stack 26.

In an alternative embodiment, the gate structure 23 may be omitted from the construction of the sensor device. In an alternative embodiment, the gate structure 23 may include the gate dielectric layer 24 and one or more functional layers instead of a full gate stack.

Figure 3:
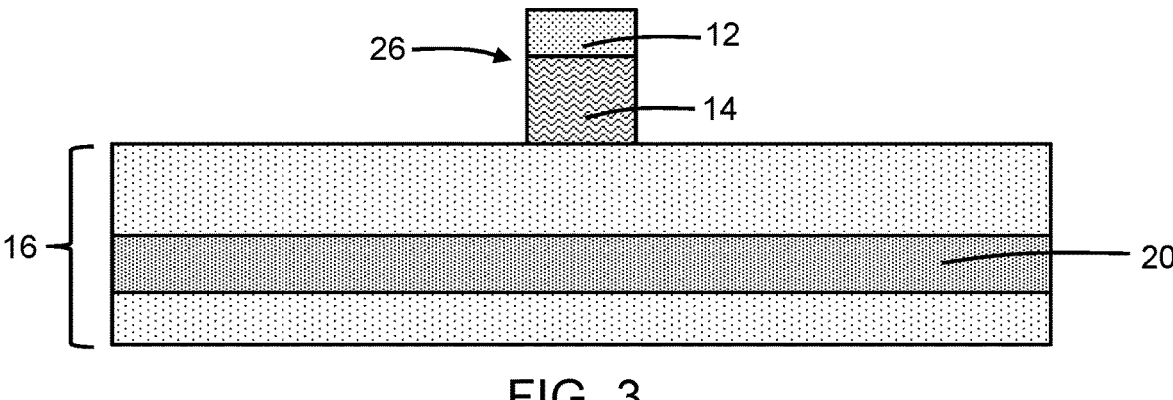
FIG. 3 is a cross-sectional view taken generally along line 3-3 in FIG. 2.
Figure 3A:
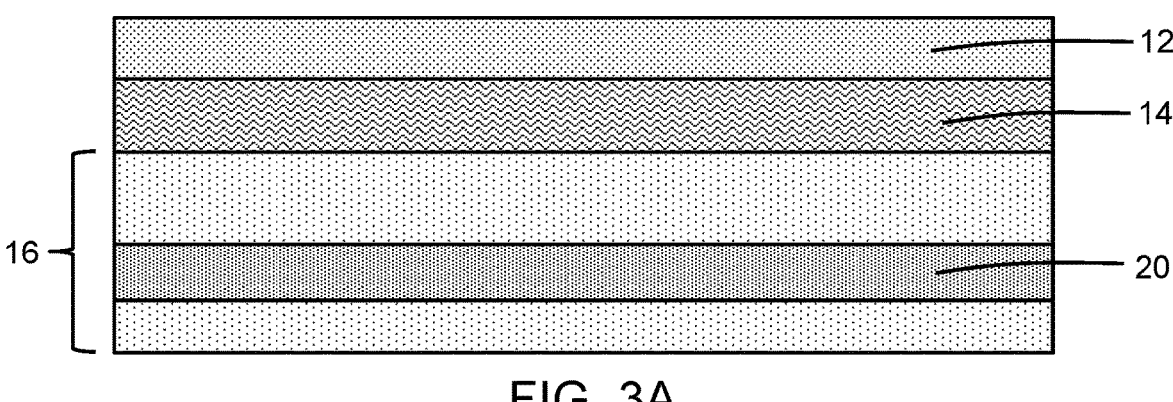
FIG. 3A is a cross-sectional view taken generally along line 3A-3A in FIG. 2.
Figure 3B:
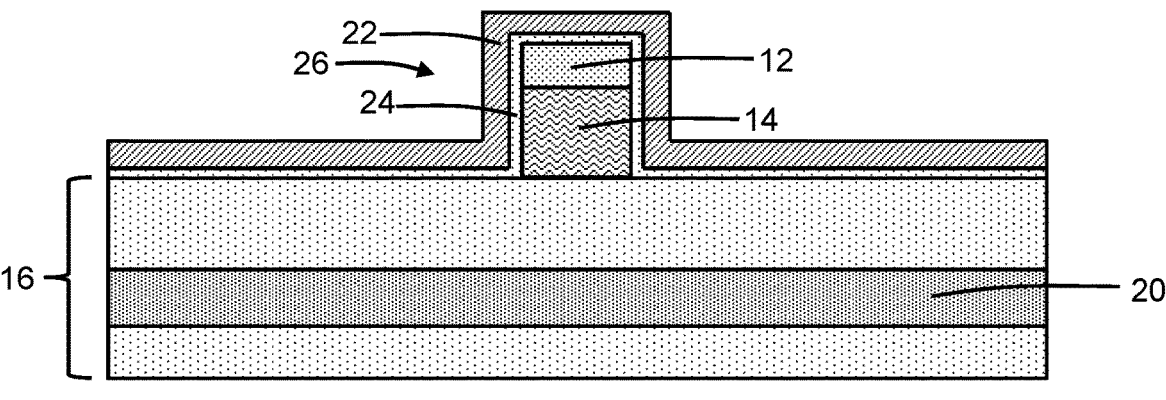
FIG. 3B is a cross-sectional view taken generally along line 3B-3B in FIG. 2.
Figure 4:
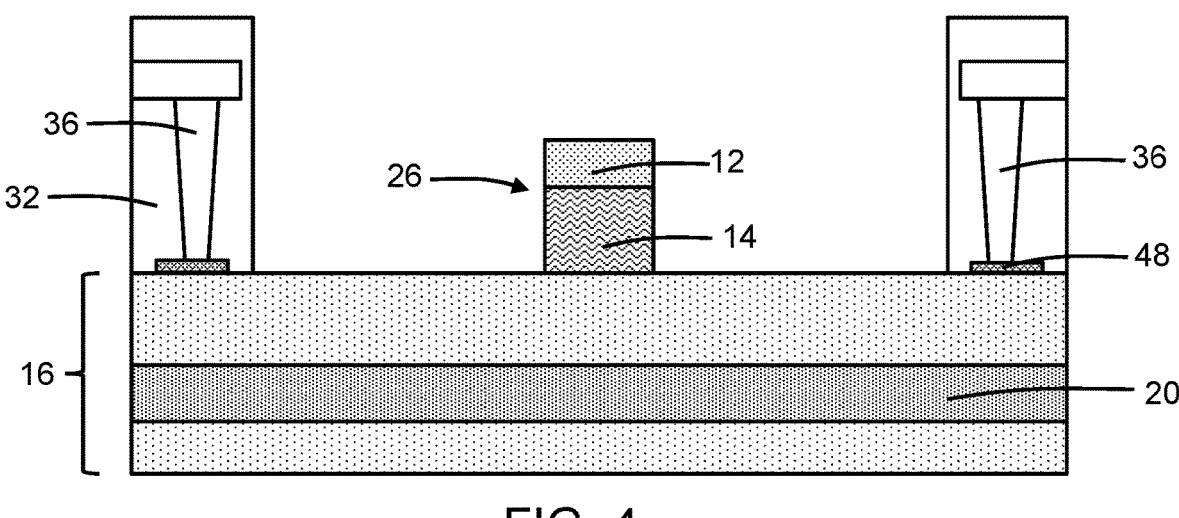
FIGS. 4, 4A, 4B are cross-sectional views of the structure at a fabrication stage of the processing method subsequent to FIGS. 3, 3A, 3B.
Figure 4A:
Figure 4B:
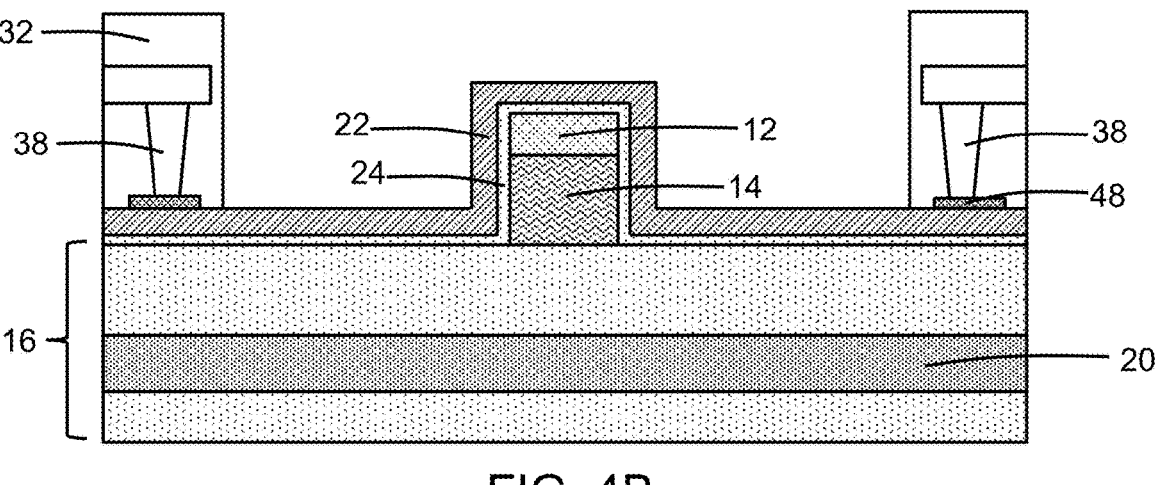

With reference to FIGS. 4, 4A, 4B in which like reference numerals refer to like features in FIGS. 3, 3A, 3B and at a subsequent fabrication stage, raised semiconductor layers 28, 30 of the sensor device are formed on the portions of the semiconductor layer 12 included in the layer stack 26 that are located on opposite sides of the gate structure 23. The raised semiconductor layers 28, 30 may be formed by the selective epitaxial growth of semiconductor material (e.g., single-crystal silicon) from the portions of the semiconductor layer 12. In an embodiment, the semiconductor material of the raised semiconductor layers 28, 30 may be doped (e.g., heavily doped) with a concentration of a dopant, such as an n-type dopant (e.g., phosphorus or arsenic) that provides n-type conductivity. A dielectric layer may be applied and patterned to reveal the portions of the semiconductor layer 12 on which the raised semiconductor layers 28, 30 are formed and then removed after the raised semiconductor layers 28, 30 are formed.

A dielectric layer 32 of the sensor device is deposited and patterned such that the portions of the semiconductor layer 12 and the dielectric layer 14 included in the layer stack 26 and portions of the semiconductor substrate 16 adjacent to the layer stack 26 are exposed. The dielectric layer 32 may be comprised of a dielectric material, such as silicon dioxide, that is an electrical insulator. The sensor device includes contacts 34, 36, 38 that are formed in the dielectric layer 32. The contacts 34, 36, 38 may be comprised of a metal, such as tungsten. A silicide layer 48 may be formed on areas of the raised semiconductor layers 28, 30, the gate electrode 22, and the semiconductor substrate 16 before depositing the dielectric layer 32 and forming the contacts 34, 36, 38.

The contacts 34, the raised semiconductor layers 28, 30 and the portions of the semiconductor layer 12 on which the raised semiconductor layers 28, 30 are located provide electrical connections that are physically and electrically connected to the portion of the semiconductor layer 12 included in the layer stack 26. The contacts 36 provide electrical connections that are physically and electrically connected to the semiconductor substrate 16, and the contacts 38 provide electrical connections that are physically and electrically connected to the gate electrode 22 of the gate structure 23. The portion of the semiconductor layer 12 included in the layer stack 26 is positioned in a lateral direction between the different contacts 36.

Figure 5:
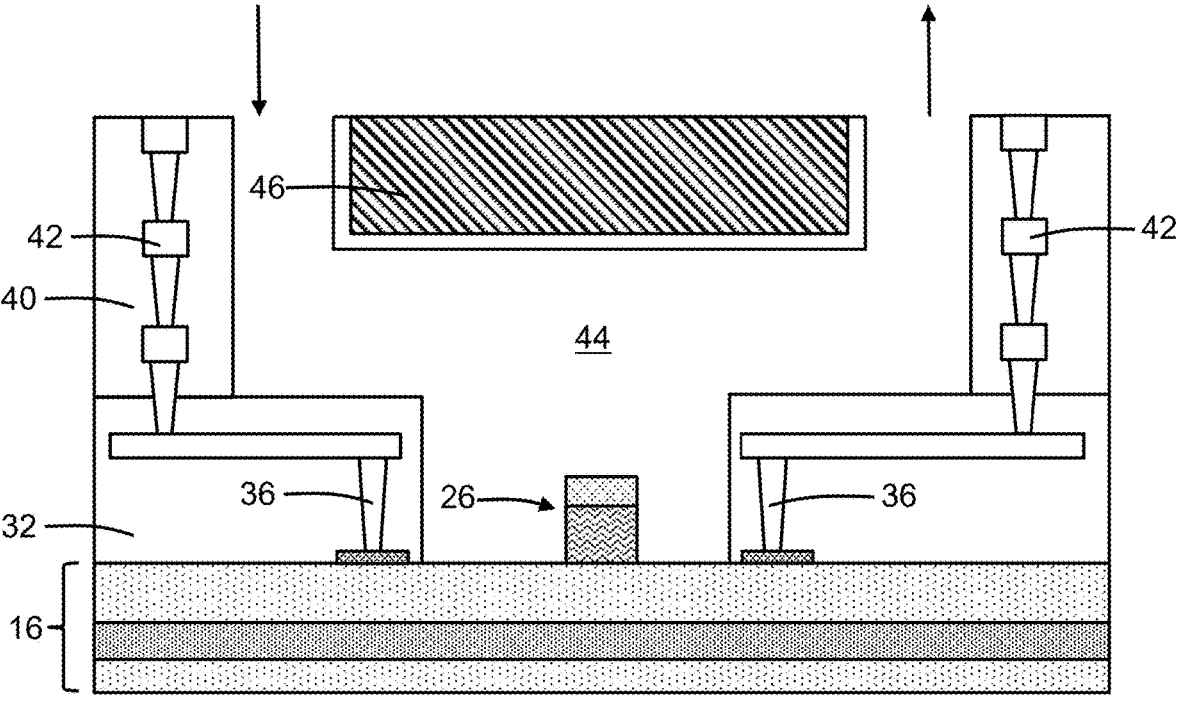
FIGS. 5, 5A, 5B are cross-sectional views of the structure at a fabrication stage of the processing method subsequent to FIGS. 4, 4A, 4B.
Figures 5A, 5B:
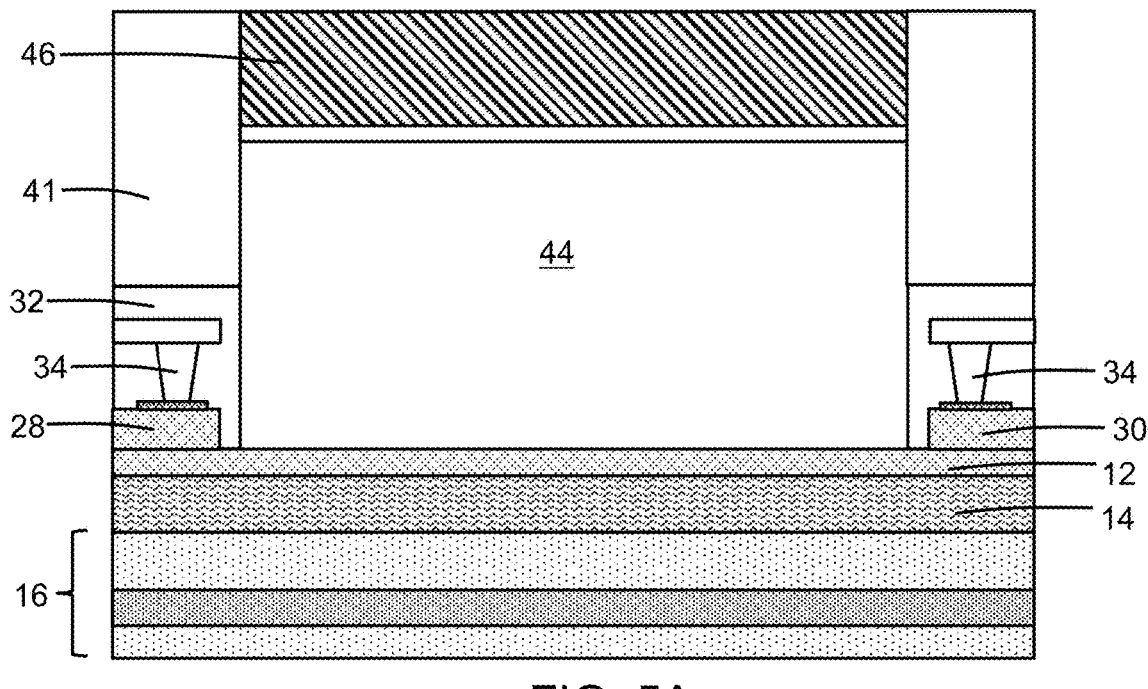

With reference to FIGS. 5, 5A, 5B in which like reference numerals refer to like features in FIGS. 4, 4A, 4B and at a subsequent fabrication stage, an interconnect structure of the sensor device is formed that includes a dielectric layer stack 40 containing multiple dielectric layers and vertical interconnections 42 in the dielectric layer stack 40 that are physically and electrically connected to the contacts 36. Vertical interconnections 43 similar to the vertical interconnections 42 are formed in the dielectric layer stack 40 and are physically and electrically connected to the contacts 38. The contacts 34 may also be connected to vertical interconnections (not shown) within the interconnect structure. Lower portions of the vertical interconnections 42, 43 and the vertical interconnections to the contacts 34 may be formed inside the dielectric layer 32. In an alternative embodiment, the tiered wiring of the vertical interconnections 42, 43 may be replaced by monolithic contact pillars. Each dielectric layer in the dielectric layer stack 40 may be comprised of a dielectric material, such as silicon dioxide, silicon nitride, tetraethylorthosilicate silicon dioxide, or fluorinated-tetraethylorthosilicate silicon dioxide, that is an electrical insulator, and the vertical interconnections 42, 43 may be comprised of one or more metals, such as copper or aluminum.

A microfluidic channel 44 of the sensor device is formed that extends through the dielectric layers of the dielectric layer stack 40. The contacts 34, 36, 38, which are embedded in dielectric material of the dielectric layer 32 at the periphery of the microfluidic channel 44, are isolated from the microfluidic channel 44. The microfluidic channel 44 may be formed by, for example, the removal of a sacrificial material from the dielectric layer stack 40, or by a separate direct patterning step with an undercut etch.

An electrode 46 of the sensor device may be positioned inside the microfluidic channel 44. The electrode 46 may be comprised of a metal, such as copper or aluminum. The electrode 46 may be formed at the same time as the dielectric layer stack 40 and the vertical interconnections 42, 43 are formed, or separately after the dielectric layer stack 40 and the vertical interconnections 42, 43 are formed. The electrode 46 may include additional contact wiring (not shown). The electrode 46 is suspended from the dielectric layers of the dielectric layer stack 40 over the portion of the semiconductor layer 12 included in the layer stack 26.

The semiconductor substrate 16 may be utilized as another electrode of a local-field biasing circuit that includes the electrode 46. The contacts 36 contribute to electrical connections providing circuit paths for a bias circuit applying a bias voltage between the electrode supplied by the semiconductor substrate 16 and the electrode 46. In an alternative embodiment, surfaces surrounding the microfluidic channel 44 may be coated by a thin conformal layer of dielectric material.

The resultant sensor device may be considered to include a sense circuit, a bias circuit, and the microfluidic channel 44. The raised semiconductor layers 28, 30 and the portion of the semiconductor layer 12 included in the layer stack 26 may provide elements of the sense circuit. The electrode 46 and the complementary electrode supplied by the semiconductor substrate 16 may provide elements of the bias circuit.

In use, the microfluidic channel 44 may receive a flowing solution containing charged particles, such as charged ions, for analysis of some property or characteristic of the solution, such as hydrogen ion concentration. The microfluidic channel 44 may have an inlet for the ingress of the solution and an outlet for the egress of the solution, as diagrammatically shown by the single-headed arrows (FIG. 5). The portion of the semiconductor layer 12 included in the layer stack 26, which defines a sensing layer of the sense circuit, is exposed to the flowing solution. A sense voltage may be applied via the contacts 36 to the sensing layer. The solution inside the microfluidic channel 44 is conductive because of, for example, ions in the solution, and provides a resistance that may vary, for example, as a function of the ion concentration of the solution. The sense current, which is measured by the sense circuit, varies based on the instantaneous resistance.

The bias circuit may be used to apply a bias voltage via the contacts 34 to the electrode 46 and the electrode supplied by the semiconductor substrate 16. The bias circuit may permit the sense device to be sensitive to ion weight and/or ion charge, in addition to being sensitive to ion concentration. The bias voltage may operate to provide a net movement of the ions, such as causing a net movement of the ions in a direction normal to the portion of the semiconductor layer 12 included in the layer stack 26.

Figures 6, 6A:
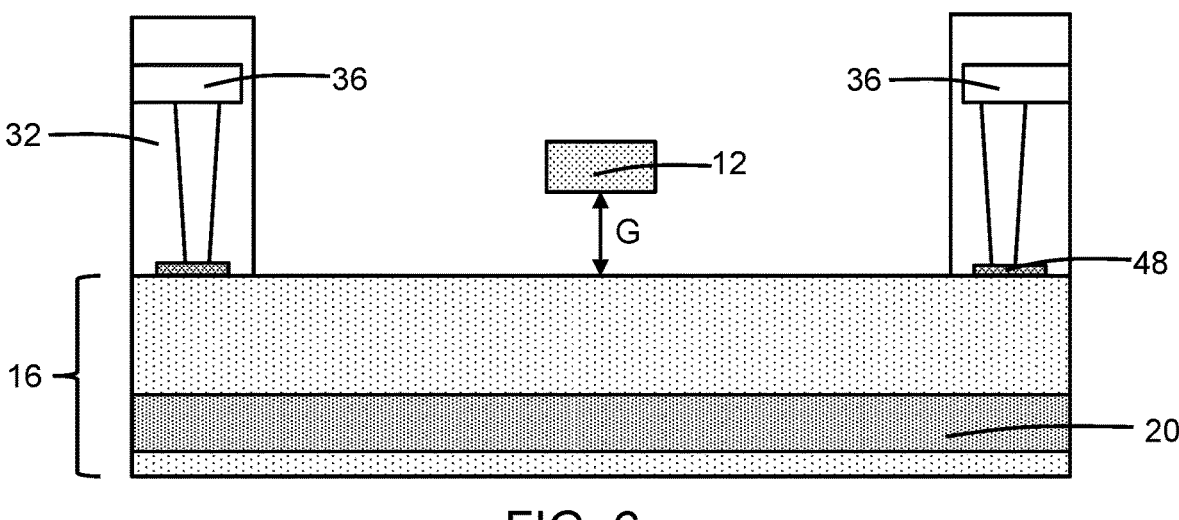
FIGS. 6, 6A, 6B are cross-sectional views of a structure in accordance with alternative embodiments of the invention.
Figures 6B, 7:
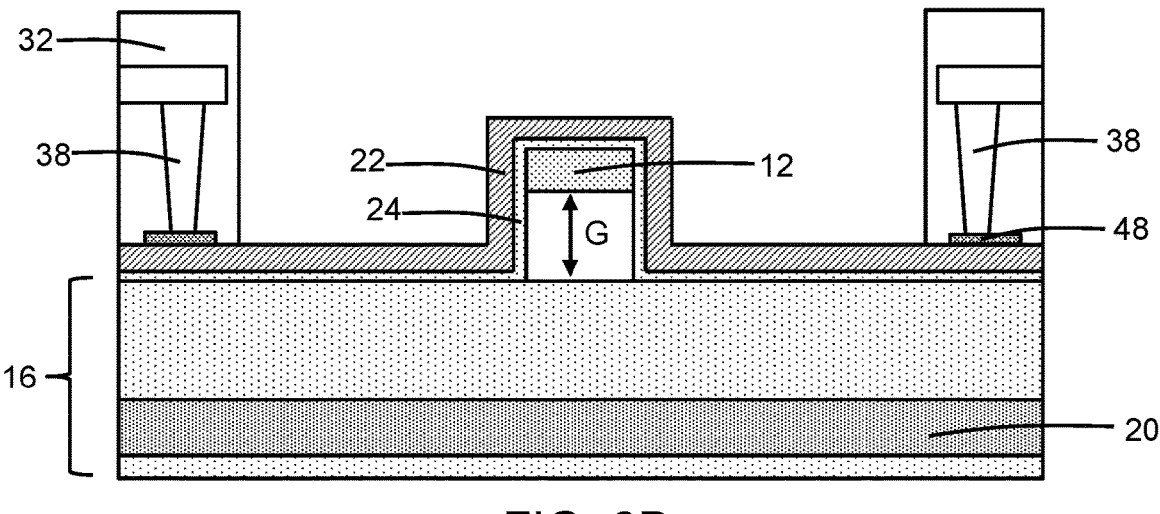
FIG. 7 is a cross-sectional view of a structure in accordance with alternative embodiments of the invention.

With reference to FIGS. 6, 6A, 6B in which like reference numerals refer to like features in FIGS. 4, 4A, 4B and in accordance with alternative embodiments of the invention, the dielectric material of the dielectric layer 14 included in the layer stack 26 may be removed by an etching process such that only portion of the semiconductor layer 12 included in the layer stack 26 remains. In an embodiment, the etching process may be an isotropic wet chemical etching process. The etch chemistry of the isotropic etching process is selected to remove the dielectric material of the dielectric layer 14 selective to the semiconductor materials of the semiconductor layer 12 and the semiconductor substrate 16. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process.

The portion of the semiconductor layer 12 included in the layer stack 26 is spaced above the underlying semiconductor substrate 16 with gap Gin the space between the portion of the semiconductor layer 12 and the underlying semiconductor substrate 16. The portion of the semiconductor layer 12 included in the layer stack 26 is supported at opposite ends and defines a bridge of material that is suspended above the semiconductor substrate 16 with the gap G between the portion of the semiconductor layer 12 and the semiconductor substrate 16. During use, the solution filling the open space of the gap G may function to modulate the threshold voltage. In an embodiment, the height of the gap G may be equal to the thickness of the portion of the dielectric layer 14 that is removed from the layer stack 26.

Processing continues as described in connection with FIGS. 5, 5A, 5B to complete the formation of the sense device. In an alternative embodiment, the gate structure 23 may be omitted from the device construction that includes the gap G.

With reference to FIG. 7 and in accordance with alternative embodiments of the invention, a doped region 50 and a doped region 52 may be formed in the semiconductor substrate 16. In an embodiment, the doped region 50 may be positioned adjacent to one side of the gate structure 23, and the doped region 52 may be positioned adjacent to an opposite side of the gate structure 23. The layer stack 26 extends longitudinally across the doped regions 50, 52. The doped region 50 is doped to have an opposite conductivity type from the doped region 52. In an embodiment, the doped region 50 may be doped with a concentration of an n-type dopant (e.g., arsenic or phosphorus) to provide n-type conductivity, and the doped region 52 may be doped (e.g., heavily doped) with a concentration of a p-type dopant (e.g., boron) to provide p-type conductivity. The gate structure 23 is positioned in a lateral direction between the doped region 50 and the doped region 52.

Processing continues as described in connection with FIGS. 5, 5A, 5B to complete the formation of the sense device. The introduction of the doped regions 50, 52 allows for the application of a directional or asymmetric voltage bias across the sense circuit, which may accelerate ions in the solution in a lateral direction and/or may be effective to separate positive ions from negative ions.

Figure 8:
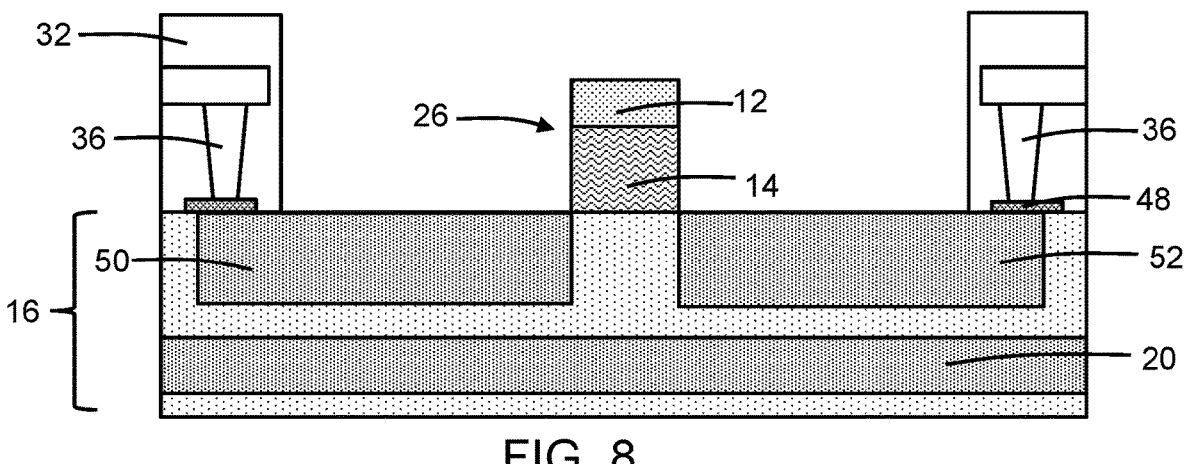
FIG. 8 is a cross-sectional view of a structure in accordance with alternative embodiments of the invention.

With reference to FIG. 8 and in accordance with alternative embodiments of the invention, the doped regions 50, 52 may be relocated in the semiconductor substrate 16 such that the doped region 50 is positioned adjacent to one side the layer stack 26, the doped region 52 is positioned adjacent to one side the layer stack 26, and the gate structure 23 extends longitudinally across the doped regions 50, 52. Processing continues as described in connection with FIGS. 5, 5A, 5B to complete the formation of the sense device. In an alternative embodiment, the gate structure 23 may be omitted from the device construction that includes the doped regions 50, 52. The introduction of the doped regions 50, 52 may permit a directional or asymmetric voltage bias to be applied across the sense circuit.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a sensor device, the structure comprising:

a semiconductor substrate including a top surface;

a microfluidic channel above the semiconductor substrate;

a well in the semiconductor substrate beneath the microfluidic channel, the well comprising a semiconductor material having an opposite conductivity type from the semiconductor substrate;

a semiconductor layer including a first portion positioned as a sensing layer in the microfluidic channel, the first portion of the semiconductor layer spaced above the semiconductor substrate;

a gate structure including a gate electrode and a gate dielectric layer that are positioned on the top surface of the semiconductor substrate, the gate structure extending transversely across the first portion of the semiconductor layer;

an electrode positioned over the first portion of the semiconductor layer;

a first dielectric layer;

a first electrical connection coupled to the first portion of the semiconductor layer; and a second electrical connection including a contact in the first dielectric layer at a periphery of the microfluidic channel, the contact physically and electrically coupled to the semiconductor substrate, wherein the contact is included in the second electrical connection for applying a bias voltage between the semiconductor substrate and the electrode.

2. The structure of claim 1 further comprising:

a first doped region in the semiconductor substrate beneath the microfluidic channel, the first doped region having a first conductivity type; and a second doped region in the semiconductor substrate beneath the microfluidic channel, the first doped region having a second conductivity type opposite to the first conductivity type.

3. The structure of claim 2 wherein the gate structure is positioned in a lateral direction between the first doped region and the second doped region.

4. The structure of claim 2 wherein the first portion of the semiconductor layer is positioned in a lateral direction between the first doped region and the second doped region.

5. The structure of claim 1 further comprising:

a layer stack including the first portion of the semiconductor layer and a second dielectric layer positioned between the first portion of the semiconductor layer and the semiconductor substrate.

6. The structure of claim 5 wherein the second dielectric layer is a buried oxide layer of a silicon-on-insulator substrate.

7. The structure of claim 1 wherein the first portion of the semiconductor layer is suspended above the semiconductor substrate to define a gap between the first portion of the semiconductor layer and the semiconductor substrate.

8. The structure of claim 1 wherein the semiconductor layer includes a second portion and a third portion, and the first portion is longitudinally arranged between the second portion and the third portion.

9. The structure of claim 8 wherein the first electrical connection comprises the second portion of the semiconductor layer.

10. The structure of claim 8 further comprising:

a second dielectric layer positioned between the second portion and the third portion of the semiconductor layer and the semiconductor substrate.

11. The structure of claim 10 wherein the second dielectric layer is positioned between the first portion of the semiconductor layer and the semiconductor substrate.

12. The structure of claim 10 wherein the first portion of the semiconductor layer is suspended above the semiconductor substrate to define a gap between the first portion of the semiconductor layer and the semiconductor substrate.

13. The structure of claim 8 wherein the first portion of the semiconductor layer is a strip of semiconductor material extending longitudinally from the second portion of the semiconductor layer to the third portion of the semiconductor layer.

14. A method of forming a structure for a sensor device, the method comprising:

forming a microfluidic channel above a semiconductor substrate;

forming a well in the semiconductor substrate beneath the microfluidic channel, wherein the well comprises a semiconductor material having an opposite conductivity type from the semiconductor substrate;

forming a portion of a semiconductor layer positioned as a sensing layer in the microfluidic channel, wherein the portion of the semiconductor layer is spaced above the semiconductor substrate;

forming a gate structure including a gate electrode and a gate dielectric layer that are positioned on a top surface of the semiconductor substrate, wherein the gate structure extends transversely across the portion of the semiconductor layer;

forming an electrode positioned over the portion of the semiconductor layer;

forming a dielectric layer;

forming a first electrical connection coupled to the portion of the semiconductor layer; and forming a second electrical connection including a contact in the dielectric layer at a periphery of the microfluidic channel, wherein the contact is physically and electrically coupled to the semiconductor substrate, and the contact is included in the second electrical connection for applying a bias voltage between the semiconductor substrate and the electrode.

15. The structure of claim 1 wherein the semiconductor layer comprises single-crystal silicon.

* * * * *